July 30, 1963 J. P. BELL 3,099,401
ILLUMINATION MEANS FOR AUTOMOTIVE WHEELS
Filed Jan. 30, 1961 2 Sheets-Sheet 2

INVENTOR.
Joseph P. Bell
BY
ATTORNEY

United States Patent Office 3,099,401
Patented July 30, 1963

3,099,401
ILLUMINATION MEANS FOR AUTOMOTIVE WHEELS
Joseph P. Bell, 5256 Philip St., Maple Heights 37, Ohio
Filed Jan. 30, 1961, Ser. No. 85,651
2 Claims. (Cl. 240—8.12)

My invention relates in general to means for illuminating wheels and/or tires for vehicles such as, e.g., automobiles, and relates particularly to a new and novel illuminating means used for illuminating vehicle hub caps and attachment members carried thereby, certain of said attachments being known in the field as "spinners" and for illuminating tires by the employment of such means.

A primary object of my invention is to provide for vehicles illumination of the hub caps or tires so that the vehicles equipped therewith are more readily visible to approaching drivers during night driving and under other conditions of poor visibility. The illuminating device of my invention, in a manner described more specifically here below, provides a safety signal to approaching vehicles and thereby reduces accident hazards accompanying night driving or similarly hazardous poor visibility conditions.

In my co-pending application, Serial No. 736,613, filed May 20, 1958, now abandoned, I show a method of achieving this objective. In said application, the light source was located beneath the fender and the illumination from the light source reflected upon a "spinner" provided with a light-receptive surface such as fluorescent paint. While this method was effective, the source of light was exposed to rocks and other foreign material thrown from the rotating tires by the centrifugal force thereof.

It is therefore a further object of my invention to provide an arrangement wherein the source of illumination is enclosed, thus protecting the light source from damage by foreign substances.

A further object of my invention is to provide an illuminating device which, in addition to its safety feature, is also highly decorative.

A still further object of my invention is to provide an illumination device of the type described which can be readily and easily installed on automobiles without requiring a change in construction of said automobiles.

Still another object of my invention is the provision of an illuminating device wherein a metal conductive band fits directly over the vehicle brake drum and is insulated therefrom, the band being electrically connected to the illuminating source. This arrangement greatly reduces the space required for devices of this kind, thus making adaptation of my invention to existing vehicles significantly easier.

These and other objects and advantages will become more readily apparent from the drawings and the appended description of one form of mechanism embodying my invention, in which drawings:

FIGURE 4 is a cross-sectional view taken along the line 4—4 of FIGURE 1, showing more specifically the electrical connection between the band and the cable leading to the illuminating source;

FIGURE 6 is a partial cross-sectional view of a wheel equipped with a modification of the illuminating means of my invention.

Figure 1:
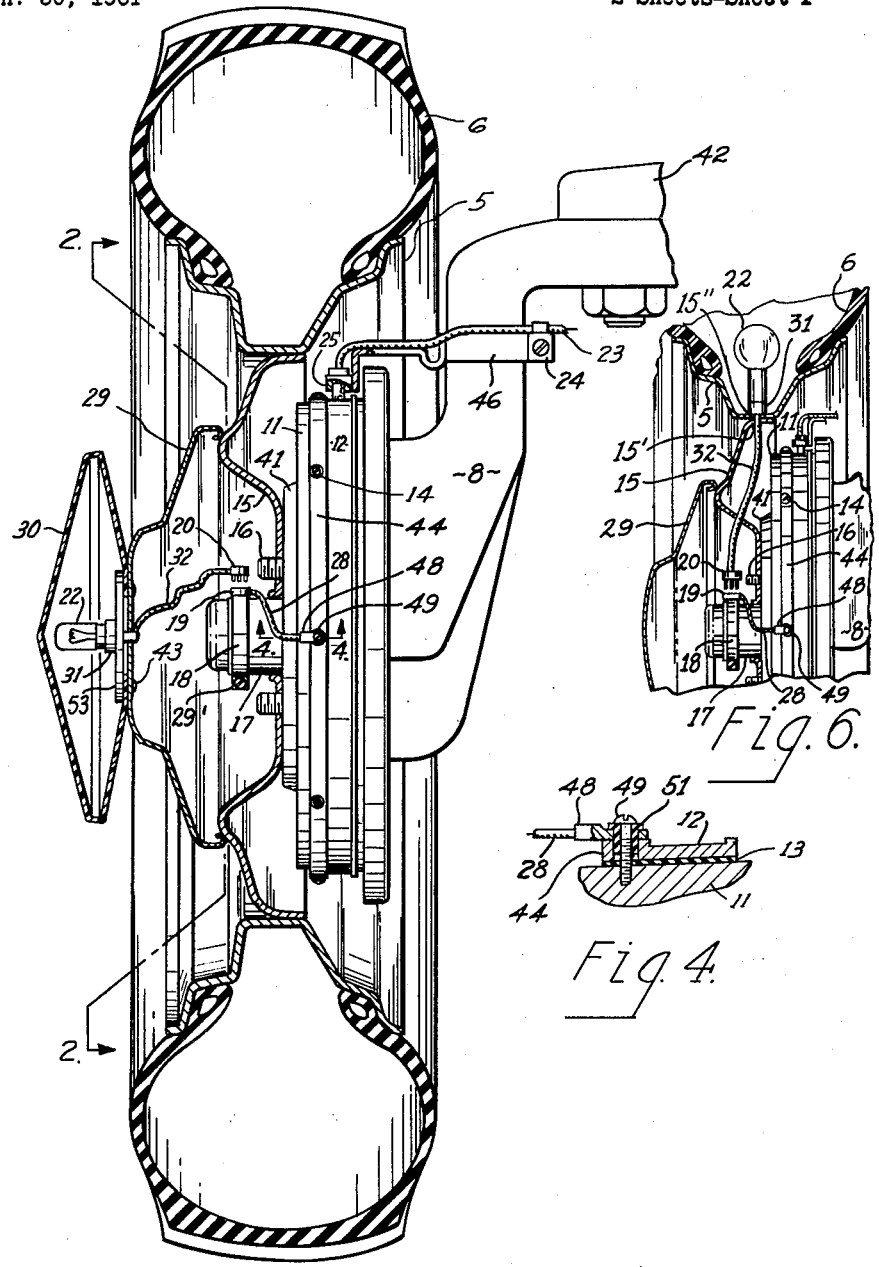
FIGURE 1 is a partial cross-sectional view of a wheel equipped with the improved illuminating means of my invention.
Figure 2:
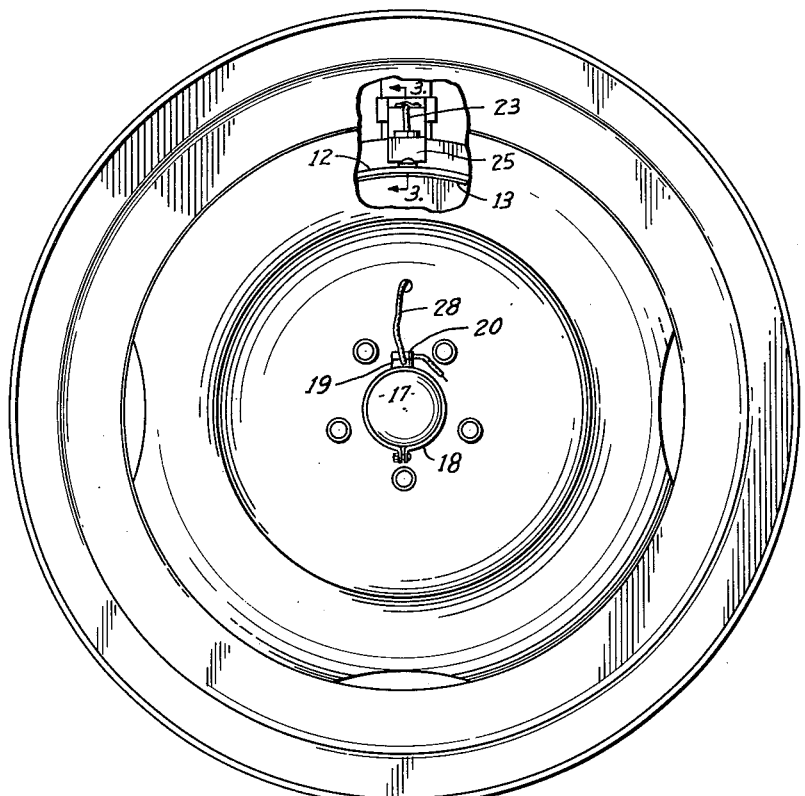
FIGURE 2 is a side elevational view of a wheel taken along the line 2—2 of FIGURE 1 with portions thereof being shown in section.

Referring now to the drawings where like numerals designate like parts, and more specifically to the form of my invention disclosed in FIGURE 1, a conventional automobile wheel is designated by numeral 5 and tire 6 is mounted thereon in a wellknown manner. The inner portion 15 of the wheel 5 fits over an axle hub 17 and is mounted on a hub plate 41 by means of hub bolts 16 which extend through apertures in the portion 15 of the wheel frame and are threadedly received in threaded apertures provided in hub plate 41. The hub plate 41, in the modification shown, rotates about a front axle (not illustrated) in a conventional manner. The axle is supported by the wheel spindle 8, the latter being connected to the frame of the vehicle through ball joint 42.

Referring now to the illuminating device of my invention, the metallic hub cap, indicated at 29, represents a hub cap which is resiliently attached to portion 15 of the wheel 5 in a conventional manner. A translucent preferably generally disk-formed housing type spinner 30 made, for example, of plastic, is securable attached to the planar central portion of the hub cap 29 by means of rivets, screw means or the like 43. The rivets 43 also rigidly affix a generally flat mounting plate 53 to the inner face of the spinner 30. Said mounting plate 53 primarily serves as a support for a light socket 31, but also serves as a strengthening device for the spinner 30. An illuminating bulb 22 is mounted in the socket 31 in a conventional manner. Electrical energy is transmitted to the bulb 22 through an electrical cable 32, in a manner to be described herein below.

Mounted on the axle hub 17, and rotating therewith, is a flange 18 surrounding the hub 17 and secured thereto by screw means 29'. Forming a part of the flange 18 is a socket 19, which is adapted to connectably receive a plug 20 in a wellknown manner, the plug 20 being connected to the end of the cable 32. A second electrical cable 28 is electrically connected to the socket 19 at one end and to a metal conducting band 12 at its other end, the connection with the band 12 being more specifically shown in FIGURE 4 and described in more detail herein below.

Mounted upon the brake drum 11 is a circular electrically conductive band 12, made of an electrically conductive metal such as, for example, copper. Although mounted on the brake drum 11, the band 12 is insulated therefrom throughout its entire circumferential extent by means of a band of insulating material 13, interposed between the drum 11 and band 12. The band and drum relationship is more clearly shown in FIGURES 3 and 4. The band 12 is mounted on the brake drum 11 by means of screws 14 threaded through a rim portion 44 of the band 12 and insulated from the band 12, as shown more clearly in FIGURE 3.

Referring now to FIGURE 4, the cable 28 is electrically connected to the band 12 through an electrically conductive contact lug 48, the latter overlying the band 12 and being compressively engaged therewith by means of screw means 49. An insulating sleeve 51 encompasses the screw 49, thus ensuring current flow directly from the band 12 to the lug 48.

Figure 5:
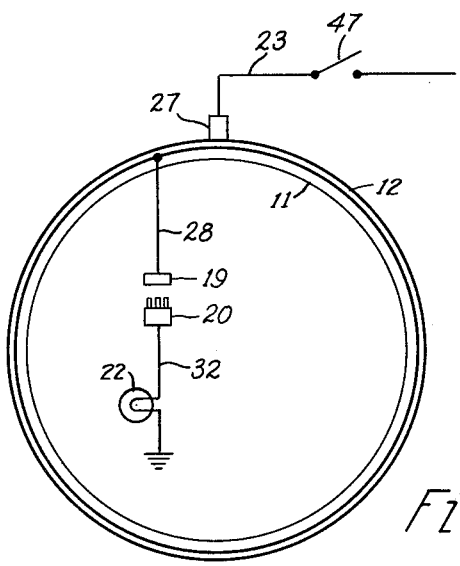
FIGURE 5 is a diagrammatical electrical circuit of my invention.
Figure 3:
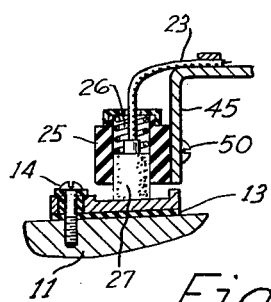
FIGURE 3 is a cross-sectional view taken along the line 3—3 of FIGURE 2, more specifically illustrating the brush and band assembly of my invention and showing the manner in which electric energy is transmitted from the stationary member to the rotating member.

Referring now to the manner in which current is carried to the band 12, a support member 45, FIGURE 3, is supportedly attached to the vertical portion of the spindle 8 by means of a clamp 46 and a screw-receiving flange 24. An electrical brush housing 25, made of insulating material, is securely mounted on the support 45 by screw means 50. Slidably mounted within the said housing 25 is a contact brush 27, the latter being yieldably urged into engagement with the band 12 by spring means 26. The cable 23 is electrically connected to the brush 27 at an upper end thereof and is removably held by clamp means 46, as shown in FIGURE 1, the cable leading to a source of electrical energy, such as, for example, a car battery, and operated by switch means 47, as shown in FIGURE 5.

It will be understood by those skilled in the art that a fluorescent tube might be substituted for the bulb 22 illustrated, in which case the cable 23 could be connected to an A.C. inverter. It will be seen that the brush 27 is in continuous contact with the band 12 and transmits current thereto from a source of electrical energy.

The operation of the device, when the switch 47 is closed, is as follows:

Current is transmitted from the source of electrical energy through cable 23 to brush 27, which is slidably mounted in the housing 25. The brush 27 continuously contacts the band 12 which is fixedly positioned on the brake drum 11 and rotates therewith. Current flows from the band 12 through the contact lug 48 to the cable 28. From the cable 28 current flows to the socket 19 and the plug 20, when the latter is operably connected to the former. Finally, current flows from the plug 20 through the cable 32 to the bulb 22 and is then grounded in a conventional manner. Attention is drawn to FIGURE 5 for a diagrammatical representation of the circuit herein described.

In the form of my invention shown in FIGURE 6, it will be noted that instead of the bulb 22 being mounted in the spinner 30, as shown in the form of FIGURE 1, said bulb could be mounted in a translucent tire, as best illustrated in FIGURE 6, and in such modification, the cable 32 would preferably be disposed through openings 15' and 15". The bulb in this form of my invention is preferably mounted above the tire well and said well is preferably coated with aluminum, or other light reflective paint.

It will thus be seen that my novel illuminating means has fulfilled the objects of my invention. I have provided a housed illuminating source which is highly decorative and provides a significant safety advantage during night driving and other periods of reduced visibility. The device can be easily and readily installed on other hub caps materially different than the ones illustrated. Further, in case the wheel must be removed, the device is easily disconnected, by merely disconnecting the plug 20 from the socket 19. Finally, by mounting the circular conducting band 12 directly on the brake drum 11 and the insulating band 12 therefrom, I have significantly reduced the space required for this type of attachment with the result that my device can be used in most existing vehicles regardless of the restricted area adjacent the brake drum.

Although I have shown my invention in connection with a preferred embodiment thereof, I am aware that numerous and extensive departures may be made therefrom, without departing from the spirit of my invention and the scope of the appended claims.

What I claim as my invention is:

1. In an illuminating device adapted to be attached to the wheel of a vehicle, a hub cap resiliently mounted on said wheel, means mounted on the outside of said hub cap, said means forming a housing for a source of illumination, a brake drum, a circular metal conductive band fixedly mounted about the periphery of said drum and spaced therefrom throughout its entirety by insulating means, a source of electrical energy and circuit means including brush means secured to a vehicle frame support, said brush means continuously contacting said conductive band, a cable, a socket mounted within said hub cap, said cable being electrically connected to said band and said socket, a pin plug connector being separably connected to said socket, a second cable, said second cable being electrically connected to said pin plug connector and to said illuminating source whereby the source of electrical energy, said band, and said illumination source are separably connected.

2. The illuminating device of claim 1 wherein said housing is spinner means mounted over said hub cap, means fixedly securing said spinner means to said hub cap, a mounting plate secured to the inside of said spinner means by said securing means, supportedly positioned on said mounting plate, and said illuminating source mounted in second socket means attached to said mounting plate.

References Cited in the file of this patent
UNITED STATES PATENTS

| | | |
|---|---|---|
| 1,739,577 | Cantu | Dec. 17, 1929 |
| 2,083,514 | Brown | June 8, 1937 |
| 2,244,206 | Longley | June 3, 1941 |
| 2,307,362 | Dupler | Jan. 5, 1943 |
| 2,871,343 | Whitney | Jan. 27, 1959 |
| 3,012,132 | Rosenfield | Dec. 5, 1961 |